3,193,502
RARE EARTH FERRITES
Michael Schieber, Tel Aviv, Israel, assignor to The
Weizmann Institute of Science, Rehovoth, Israel
No Drawing. Filed Sept. 11, 1961, Ser. No. 137,026
Claims priority, application Israel, Sept. 16, 1960, 14,392
17 Claims. (Cl. 252—62.5)

It is an object of the present invention to provide novel ferrimagnetic compositions of matter. More particularly, it is an object of the present invention to provide novel ferrimagnetic compositions of matter containing rare earth metal ions. It is yet another object of the present invention to provide novel ferrimagnetic compositions of matter, ternary respective the metal ions contained therein. It is yet another object of the present invention to provide novel ferrimagnetic compositions of matter having a high moment of magnetization at ambient temperature. It is yet another object of the present invention to provide novel ferrimagnetic compositions of matter, containing ions of lanthanum, which are at least equivalent to similar compositions based on yttrium, which is much more expensive. Other objects of the present invention will become apparent hereinafter.

It is known that $La_2O_3$ and $Fe_2O_3$ yield the antiferromagnetic composition of matter corresponding to the formula $LaFeO_3$, which has a perovskitic crystal structure.

Certain ferrimagnetic compositions of matter are known, such as for example $La_{0.5}Na_{0.5}Fe_{12}O_{19}$, having a magneto plumbite crystal structure and such as $LaCoFe_{11}O_{19}$. These are ternary systems, comprising oxides of Fe and La together with oxides of either sodium or cobalt.

The present invention comprises novel ferrimagnetic compositions of matter, containing rare earth metal ions. More particularly, the present invention relates to ternary ferrimagnetic compositions of matter containing rare earth metal ions, in combination with either an element of group II–A of the Periodic Table of Elements, such as calcium, strontium or barium; or with lead, or with another rare earth element and iron. Thus said ternary ferrimagnetic composition (ternary respective the metal ions) comprises Fe, together with either one element of group III–B of the Periodic System and one element of the group Sr, Ba, Ca and Pb; or Fe together with two elements of group III–B of the Periodic System, in combination with either oxygen alone or in combination with oxygen and fluorine.

The novel ferrimagnetic compositions of matter according to the invention correspond with either of the following formulae, namely:

$$La_xM_{1-x}Fe_{12}O_{19-y}F_y$$

where M is a member selected from the group comprising Ca, Sr, Ba and Pb, x varying between 0.2 and 0.9, y varying between 0 and 3, said compositions having a magneto plumbite crystal structure, or $$Z_xN_{3-x}Fe_5O_{12}$$

where Z is a member selected from the group La, Pr and Nd, where N is a member selected from the group Y and the rare earth metals, except La, Pr and Nd and where x has a value between 0.1 and 2.1, said novel ferrimagnetic compositions of matter having a garnet type crystal structure.

The novel ferrites of magneto-plumbite crystal structure have a high moment of magnetization saturation at room temperature, the moment being higher in the compositions containing fluorine.

These novel ferrites are useful for different purposes and may be used advantageously wherever magneto plumbite type ferrites are used. For example, these compositions may be used as permanent magnets, in tapes for tape-recorders and the like.

The substitution of lanthanum for at least part of the considerably more expensive yttrium is of economic value. The novel garnet type ferrites according to the invention are at least equivalent in their magnetic properties to the yttrium-iron and rare-earth/iron garnet type ferrites used in microwave and ferromagnetic resonance applications.

Furthermore, neodymium and praseodymium in the garnet structure increase the magnetic moment of the ferrite at room temperature, because the magnetic moment of these ions has an orientation parallel with the "net iron moment," i.e., the resultant moment of the five iron ions (3 minus 2). This is different from corresponding ferrites of garnet structure, containing instead of neodymium or praseodymium an ion of the series Gd to Yb, which have a magnetic moment opposed to the "net iron moment."

The invention will be exemplified by the following examples, without being limited to same. In these examples certain definite compositions are exemplified. It is clearly understood that the corresponding compositions, as defined by the ranges indicated in the above formulae, can be prepared by analogous methods.

*Example 1*

In an agate mortar there were ground together during about 30 minutes 49.0 g. dry $La_2O_3$, 70.0 g. $CaCO_3$ and 880.0 g. $Fe_2O_3$. The dry powder was pressed to pellets and prefired during 5 hours to a temperature of 1300° C. The pellets were reground, again pressed to pellets and fired 6 hours at a temperature of 1340° C. A ferrite of magneto-plumbite having a magnetic moment of $70\pm1$ cgs./g. was obtained, corresponding with the formula $La_{0.3}Ca_{0.7}Fe_{12}O_{19}$.

*Example 2*

A dry mixture of 78.0 g. $LaF_3$, 47.0 g. $CaF_2$ and 880.0 g. $Fe_2O_3$ was prepared, preheated and fired as described in Example 1.

A ferrite of magneto-plumbite crystal structure, of magnetic moment $73\pm1$ cgs./g., corresponding with the formula $La_{0.4}Ca_{0.6}Fe_{12}O_{18.5}F_{0.5}$ was obtained.

*Example 3*

A dry mixture of 98.0 g. $LaF_3$, 63.0 g. $SrF_2$ and 880.0 g. $Fe_2O_3$ was prepared, preheated and fired according to Example 1. A ferrite of magneto-plumbite crystal structure, having a magnetic moment of 66 cgs./g. was obtained, which corresponds with the formula $$La_{0.5}Sr_{0.5}Fe_{12}O_{18}F$$

*Example 4*

A dry mixture of 98.0 g. $LaF_3$, 88.0 g. $BaF_2$ and 880.0 g. $Fe_2O_3$ was prepared, preheated and fired as described in Example 1. A ferrite of magneto-plumbite crystal structure, having a magnetic moment of 64 cgs./g. was obtained, corresponding with the formula $La_{0.5}Ba_{0.5}Fe_{12}O_{18}F$.

Example 5

A dry mixture of 165.0 g. $La_2O_3$, 570.0 g. $Y_2O_3$ and 820.0 g. $Fe_2O_3$ was prepared, preheated and fired as described in Example 1. A ferrite of garnet type crystal structure, having a magnetic moment of 27 cgs./g. was obtained, corresponding with the formula $Y_{2.5}La_{0.5}Fe_5O_{12}$.

Example 6

A dry powdery mixture of 400.0 g. $Pr_6O_{11}$, 460.0 g. $Y_2O_3$ and 820.0 g. $Fe_2O_3$ was prepared, preheated and fired according to Example 1. A ferrite of garnet type crystal structure, of a magnetic moment of 26 cgs./g. was obtained, corresponding with the formula $Y_2Pr_1Fe_5O_{12}$.

Example 7

A dry powdery mixture of 135.0 g. $Nd_2O_3$, 452.0 g. $Y_2O_3$ and 164.0 g. $Fe_2O_3$ was prepared, preheated and fired according to Example 1. A ferrite of garnet type crystal structure, having a magnetic moment of 29 cgs./g. was obtained, corresponding with the formula $$YNd_2Fe_5O_{12}$$

Example 8

A dry powdery mixture of 7.64 g. $Er_2O_3$, 3.36 g. $Nd_2O_3$ and 8.00 g. $Fe_2O_3$ was prepared, preheated and fired as described in Example 1. A ferrite of garnet type crystal structure, having a magnetic moment of 20 cgs./g. was obtained, corresponding with the formula $Er_2NdFe_5O_{12}$.

Example 9

A dry mixture of 7.46 g. $Dy_2O_3$, 3.40 g. $Pr_2O_3$ and 8.00 g. $Fe_2O_3$ was prepared, preheated and fired as described in Example 1. A ferrite of garnet type crystal structure, having a magnetic moment of 15 cgs./g. and corresponding with the formula $Dy_2PrFe_5O_{12}$ was obtained.

Example 10

A dry mixture of 3.07 g. $Nd_2O_3$, 2.06 g. $Y_2O_3$ and 4.88 g. $Fe_2O_3$ was prepared, preheated and fired subsequently at a temperature of 1450° C. A melt was obtained. The novel ferrite thus obtained has a garnet crystal structure, a magnetic moment of 16 cgs./g., and corresponds with the formula $Y_{1.5}Nd_{1.5}Fe_5O_{12}$.

Example 11

A mixture of 3.63 g. $Pr_2(C_2O_4)_3 \cdot 10H_2O$, 6.04 g. $Y_2(C_2O_4)_3 \cdot 9H_2O$ and 4.00 g. $Fe_2O_3$ was prepared and thoroughly mixed. The mixture was prefired at 700° C. during 1 hour, reground, pressed into pellets and fired at 1360° C. during 10 hours. A ferrite of garnet type crystal structure, of magnetic moment 28 cgs./g., corresponding with the formula $Y_2PrFe_5O_{12}$, was obtained.

Example 12

A mixture of 2.17 g. $La(NO_3)_3 \cdot 6H_2O$, 9.60 g.

$$Y(NO_3)_3 \cdot 6H_2O$$

and 4.00 g. $Fe_2O_3$ was prepared and thoroughly mixed. The mixtue was placed in a platinum crucible, prefired during 1 hour at 700° C., reground, pressed to pellets and fired at 1360° C. during 10 hours. During the prefiring, melting took place at about 40° C., at about 100° C. water of crystallization was lost, and up to 700° C. the nitrates were completely decomposed, yielding the corresponding oxides. A ferrite of garnet type crystal structure, having a magnetic moment of 27 cgs./g. was obtained, corresponding with the formula $Y_{2.5}La_{0.5}Fe_5O_{19}$.

Analogous novel ferrites, in the range of compositions as defined in the general formulae given above, were prepared by using suitable ratios of starting materials. In the following table, the crystallographic data and magnetic unit of a number of such compositions is given. These compositions are of the garnet type; the crystal unit cell is given in A.-units; and $\sigma$—the magnetic moment at room temperature, is given in cgs./g.

| | $a(\pm 0.02$ A.$)$ | $\sigma (\pm 2$ cgs./g.$)$ |
|---|---|---|
| $Y_{2.5}Nd_{0.5}Fe_5O_{12}$ | 12.41 | 27 |
| $Y_2Nd_1Fe_5O_{12}$ | 12.45 | 28 |
| $Y_{1.5}Nd_{1.5}Fe_5O_{12}$ | 12.49 | 28 |
| $Y_1Nd_2Fe_5O_{12}$ | 12.53 | 28 |
| $Y_{2.5}Pr_{0.5}Fe_5O_{12}$ | 12.42 | 28 |
| $Y_2Pr_1Fe_5O_{12}$ | 12.47 | 28 |
| $Y_{2.5}La_{0.5}Fe_5O_{12}$ | 12.43 | 27 |
| $Sm_{2.5}Nd_{0.5}Fe_5O_{12}$ | 12.54 | 22 |
| $Eu_{2.5}Nd_{0.5}Fe_5O_{12}$ | 12.52 | 17 |
| $Eu_{2.0}Nd_1Fe_5O_{12}$ | 12.53 | 19 |
| $Eu_{2.5}Pr_{0.5}Fe_5O_{12}$ | 12.53 | 17 |
| $Gd_{2.5}Nd_{0.5}Fe_5O_{12}$ | 12.49 | 7 |
| $Gd_2Nd_1Fe_5O_{12}$ | 12.51 | 10 |
| $Gd_{1.5}Nd_{1.5}Fe_5O_{12}$ | 12.53 | 13 |
| $Gd_{2.5}Pr_{0.5}Fe_5O_{12}$ | 12.49 | 6 |
| $Gd_2Pr_1Fe_5O_{12}$ | 12.53 | 9 |
| $Gd_{2.5}La_{0.5}Fe_5O_{12}$ | 12.50 | 6 |
| $Tb_{2.5}Nd_{0.5}Fe_5O_{12}$ | 12.48 | 5 |
| $Tb_2Nd_1Fe_5O_{12}$ | 12.50 | 7 |
| $Tb_{1.5}Nd_{1.5}Fe_5O_{12}$ | 12.52 | 9 |
| $Tb_{2.5}Pr_{0.5}Fe_5O_{12}$ | 12.48 | 5 |
| $Tb_{2.0}Pr_1Fe_5O_{12}$ | 12.51 | 6 |
| $Tb_{2.5}La_{0.5}Fe_5O_{12}$ | 12.49 | 5 |
| $Dy_{2.5}Nd_{0.5}Fe_5O_{12}$ | 12.43 | 9 |
| $Dy_2Nd_1Fe_5O_{12}$ | 12.47 | 13 |
| $Dy_{1.5}Nd_{1.5}Fe_5O_{12}$ | 12.50 | 17 |
| $Dy_{2.5}Pr_{0.5}Fe_5O_{12}$ | 12.44 | 9 |
| $Dy_2Pr_1Fe_5O_{12}$ | 12.48 | 13 |
| $Dy_{2.5}La_{0.5}Fe_5O_{12}$ | 12.45 | 9 |
| $Ho_{2.5}Nd_{0.5}Fe_5O_{12}$ | 12.41 | 12 |
| $Ho_2Nd_1Fe_5O_{12}$ | 12.45 | 15 |
| $Ho_{1.5}Nd_{1.5}Fe_5O_{12}$ | 12.49 | 17 |
| $Ho_1Nd_2Fe_5O_{12}$ | 12.53 | 19 |
| $Ho_{2.5}Pr_{0.5}Fe_5O_{12}$ | 12.42 | 12 |
| $Ho_2Pr_1Fe_5O_{12}$ | 12.47 | 14 |
| $Ho_{1.5}La_{0.5}Fe_5O_{12}$ | 12.43 | 12 |
| $Er_{1.5}Nd_{0.5}Fe_5O_{12}$ | 12.36 | 16 |
| $Er_2Nd_1Fe_5O_{12}$ | 12.42 | 20 |
| $Er_{1.5}Nd_{1.5}Fe_5O_{12}$ | 12.48 | 21 |
| $Er_1Nd_2Fe_5O_{12}$ | 12.52 | 22 |
| $Er_{2.5}Pr_{0.5}Fe_5O_{12}$ | 12.40 | 16 |
| $Er_2Pr_1Fe_5O_{12}$ | 12.45 | 19 |
| $Er_{2.5}La_{0.5}Fe_5O_{12}$ | 12.42 | 16 |
| $Tm_{2.5}Nd_{0.5}Fe_5O_{12}$ | 12.36 | 21 |
| $Tm_2Nd_1Fe_5O_{12}$ | 12.41 | 23 |
| $Tm_{1.5}Nd_{1.5}Fe_5O_{12}$ | 12.46 | 24 |
| $Tm_1Nd_2Fe_5O_{12}$ | 12.51 | 26 |
| $Tm_{2.5}Pr_{0.5}Fe_5O_{12}$ | 12.37 | 21 |
| $Tm_2Pr_1Fe_5O_{12}$ | 12.43 | 22 |
| $Tm_{2.5}La_{0.5}Fe_5O_{12}$ | 12.38 | 20 |
| $Yb_{2.5}Nd_{0.5}Fe_5O_{12}$ | 12.34 | 19 |
| $Yb_2Nd_1Fe_5O_{12}$ | 12.40 | 21 |
| $Yb_{1.5}Nd_{1.5}Fe_5O_{12}$ | 12.45 | 24 |
| $Yb_1Nd_2Fe_5O_{12}$ | 12.49 | 25 |
| $Yb_{2.5}Pr_{0.5}Fe_5O_{12}$ | 12.35 | 21 |
| $Yb_2Pr_1Fe_5O_{12}$ | 12.41 | 23 |
| $Yb_{1.5}Pr_{1.5}Fe_5O_{12}$ | 12.46 | 25 |
| $Yb_{2.5}La_{0.5}Fe_5O_{12}$ | 12.35 | 19 |
| $Lu_{2.5}Nd_{0.5}Fe_5O_{12}$ | 12.33 | 21 |
| $Lu_2Nd_1Fe_5O_{12}$ | 12.38 | 22 |
| $Lu_{1.5}Nd_{1.5}Fe_5O_{12}$ | 12.44 | 24 |
| $Lu_1Nd_2Fe_5O_{12}$ | 12.49 | 27 |
| $Lu_{2.5}Pr_{0.5}Fe_5O_{12}$ | 12.34 | 21 |
| $Lu_2Pr_1Fe_5O_{12}$ | 12.40 | 22 |
| $Lu_{1.5}Pr_{1.5}Fe_5O_{12}$ | 12.46 | 23 |
| $Lu_{2.5}La_{0.5}Fe_5O_{12}$ | 12.35 | 20 |

Although I have described my invention with a certain degree of particularity, it is understood that the present disclosure is illustrative and not restrictive, since the scope of the invention is defined by the appended claims rather than by the description preceding them, and all changes which fall within the metes and bounds of the claims are intended to be embraced by these claims.

I claim:

1. A ferrimagnetic composition of matter of garnet crystal structure, ternary respective the metal ions contained therein, consisting of a member selected from a first group consisting of La, Pr and Nd; a member selected from a second group consisting of Y, rare earths other than La, Pr and Nd; and iron, and oxygen, where the garnet crystal composition contains at least one atom of a member from the first group for each fifty atoms of iron and at least nine atoms of a member from the second group for each fifty atoms of iron.

2. A ferrimagnetic composition of matter corresponding with the formula $$Z_xN_3-Fe_5O_{12}$$

where:

Z is a member selected from the group consisting of La, Pr and Nd,

N is a member selected from the group consisting of Y and rare earths except La, Pr, and Nd, and
x is between 0.1 and 2.1.

3. A ferrimagnetic composition of matter, of garnet type crystal structure, substantially corresponding with the formula $$Y_{2.5}La_{0.5}Fe_5O_{12}$$

4. A ferrimagnetic composition of matter, of garnet type crystal structure, substantially corresponding with the formula $$Y_{2.0}Pr_{1.0}Fe_5O_{12}$$

5. A ferrimagnetic composition of matter of garnet type crystal structure, substantially corresponding with the formula $$YNd_2Fe_5O_{12}$$

6. A ferrimagnetic composition of garnet type crystal structure, substantially corresponding with the formula $$Er_2NdFe_5O_{12}$$

7. A ferrimagnetic composition of matter of garnet type crystal structure, substantially corresponding with the formula $$Dy_2PrFe_5O_{12}$$

8. A ferrimagnetic composition of matter of garnet type crystal structure, substantially corresponding with the formula $$Y_{1.5}Nd_{1.5}Fe_5O_{12}$$

9. A ferrimagnetic composition of matter of garnet type crystal structure, substantially corresponding with the formula $$Y_2PrFe_5O_{12}$$

10. A ferrimagnetic composition of matter of magneto plumbite corresponding with the formula $$La_xM_{1-x}Fe_{12}O_{19-y}F_y$$

where M is a member selected from the group consisting of Ca, Sr, Ba and Pb; x varies between 0.2 and 0.9 and y is between 0 and 3.

11. A ferrimagnetic composition of matter of magneto plumbite corresponding with the formula $$La_xCa_{1-x}Fe_{12}O_{19-y}F_y$$

where x is between 0.5 and 1.0 and y is between 0 and 3.

12. A ferrimagnetic composition of matter of magneto plumbite corresponding with the formula $$La_xCa_{1-x}Fe_{12}O_{19-y}F_y$$

where x is between 0.5 and 1.0 and y is between 0 and 0.5.

13. A ferrimagnetic composition of matter, of magnetoplumbite crystal structure, substantially corresponding with the formula $$La_{0.6}Ca_{0.4}Fe_{12}O_{19}$$

14. A ferrimagnetic composition of matter, of magnetoplumbite crystal structure, substantially corresponding with the formula $$La_{0.6}Ca_{0.4}Fe_{12}O_{18.5}F_{0.5}$$

15. A ferrimagnetic composition of matter of magnetoplumbite crystal structure, substantially corresponding with the formula $$La_{0.5}Sr_{0.5}Fe_{12}O_{18}F$$

16. A ferrimagnetic composition of matter, of magnetoplumbite crystal structure, substantially corresponding with the formula $$La_{0.5}Ba_{0.5}Fe_{12}O_{18}F$$

17. A ferrimagnetic composition of matter of garnet type structure, substantially corresponding with the formula $$Y_{2.5}La_{0.5}Fe_5O_{19}$$

References Cited by the Examiner
UNITED STATES PATENTS 3,085,980  4/63  Gorter et al. _____ 252—62.5

FOREIGN PATENTS 1,042,080  10/58  Germany.

OTHER REFERENCES

Van Uitert et al.: Ferrimagnetic Resonance Line Widths, etc., J. Amer. Ceramics Soc., October 1959, page 471.

MAURICE A. BRINDISI, *Primary Examiner.*

JOSEPH R. LIBERMAN, *Examiner.*